United States Patent
Bowman et al.

(10) Patent No.: US 6,357,834 B1
(45) Date of Patent: Mar. 19, 2002

(54) HEAVY VEHICLE AXLE WITH SEPARATE LOAD-BEARING DEVICE

(75) Inventors: Larry W. Bowman, Troy; Patrick D. Laper, Rochester; Raji S. El-Kassouf, Sterling Heights; Michael G. Semke, Novi; Richard M. Clisch, Canton; Gary P. Ford, Rochester, all of MI (US); Joseph B. Saxon, Cookeville, TN (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/502,096

(22) Filed: Feb. 10, 2000

(51) Int. Cl.$^7$ .............................................. B60B 35/00
(52) U.S. Cl. .................................................. 301/124.1
(58) Field of Search ............................ 301/124.1, 125, 301/126, 131, 5.1, 5.23, 40.2, 40.3, 40.6; 280/79.11, 79.4; 180/21; 16/45, 23, 26, 27, 28, 18 R

(56) References Cited

U.S. PATENT DOCUMENTS

| | | | | |
|---|---|---|---|---|
| 1,091,065 A | * | 3/1914 | Johnston | 301/124.1 |
| 1,183,106 A | * | 5/1916 | Noonan | 301/40.6 |
| 2,273,663 A | * | 2/1942 | Robert | 301/40.6 |
| 2,756,831 A | * | 7/1956 | Mitchell | 301/126 |
| 2,776,845 A | * | 1/1957 | Pearl | 301/124.1 |
| 2,967,580 A | | 1/1961 | Aghnides | |
| 3,071,388 A | | 1/1963 | Ulinski | |
| 3,285,447 A | * | 11/1966 | Junion | 16/24 |
| 4,060,252 A | * | 11/1977 | Mowery | 280/79.1 |
| 4,118,048 A | * | 10/1978 | Spranger et al. | 280/79.11 |
| 4,223,753 A | * | 9/1980 | Bradbury | 301/5.23 |
| 4,801,152 A | * | 1/1989 | Elliott et al. | 280/79.11 |
| 4,818,031 A | * | 4/1989 | Brown | 301/40.2 |
| 5,184,446 A | * | 2/1993 | Gustavsen | 280/79.11 |
| 5,580,074 A | * | 12/1996 | Moreno | 280/79.11 |
| 6,022,082 A | * | 2/2000 | O'Brien | 301/40.6 |

* cited by examiner

*Primary Examiner*—S. Joseph Morano
*Assistant Examiner*—Long Bao Nguyen
(74) *Attorney, Agent, or Firm*—Carlson, Gaskey & Olds

(57) ABSTRACT

An axle assembly for supporting a heavy vehicle on a surface is provided. The axle assembly has an axle housing with opposing ends and a wheel supported on each of the opposing ends for engagement with the surface. Each of the wheels is rotatable about a rotational axis. A rotatable load-bearing device is supported on the axle housing for engagement with the surface. The load-bearing device is arranged between the wheels and is rotatable about a plurality of pivotal axes. By permitting the load-bearing devices to pivot about more that one axis, unlike a conventional wheel, wear caused by scrub may be reduced. In one embodiment, the load-bearing devices are swivel wheels that are pivotal about vertical and horizontal axe. In another embodiment, the load-bearing devices are load-bearing balls that are pivotal about an infinite number of axes.

12 Claims, 1 Drawing Sheet

HEAVY VEHICLE AXLE WITH SEPARATE LOAD-BEARING DEVICE

BACKGROUND OF THE INVENTION

This invention relates to an axle assembly for supporting a heavy vehicle on a surface, and more specifically, the invention relates to load-bearing devices that reduce wear caused by scrub.

Heavy vehicles, such as a heavy duty lift truck typically utilize non-steerable assemblies that have a wheel assembly on each end of an axle housing. The wheel assembly includes a pair of wheels that are secured to one another. Utilizing multiple wheels on each end of the axle housing increases the load bearing capacity of the axle assembly. One drawback of using multiple wheels secured to one another on each end of the axle housing is an increase in tire wear from tire scrub. As the heavy vehicle negotiates a turn, the wheels on the inner radius of the turn travel a shorter distance than the wheels on the outer radius of the turn. Since the pair of wheels in a wheel assembly is secured to one another, they may only rotate at one speed. Furthermore, the wheels may not move in the direction of the turn on non-steerable axle assemblies. As a result, a portion of the wheels must be dragged, or scrub, during the turn which causes the tire to wear significantly. Increased tire wear requires more frequent tire maintenance and results in higher costs. Additionally, tires are difficult to dispose because of space constraints and environmental concerns. Therefore, what is needed is a load-bearing device that provides a high load bearing capacity axle assembly while reducing wear caused by scrub to the load bearing components.

SUMMARY OF THE INVENTION AND ADVANTAGES

The present invention provides an axle assembly for supporting a heavy vehicle on a surface. The axle assembly has an axle housing with opposing ends and a wheel supported on each of the opposing ends for engagement with the surface. Each of the wheels is rotatable about a rotational axis. A rotatable load-bearing device is supported on the axle housing for engagement with the surface. The load-bearing device is arranged between the wheels and is rotatable about a plurality of pivotal axes.

Accordingly, the above invention provides a load-bearing device that provides a high load bearing capacity axle assembly while reducing wear caused by scrub to the load bearing components.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
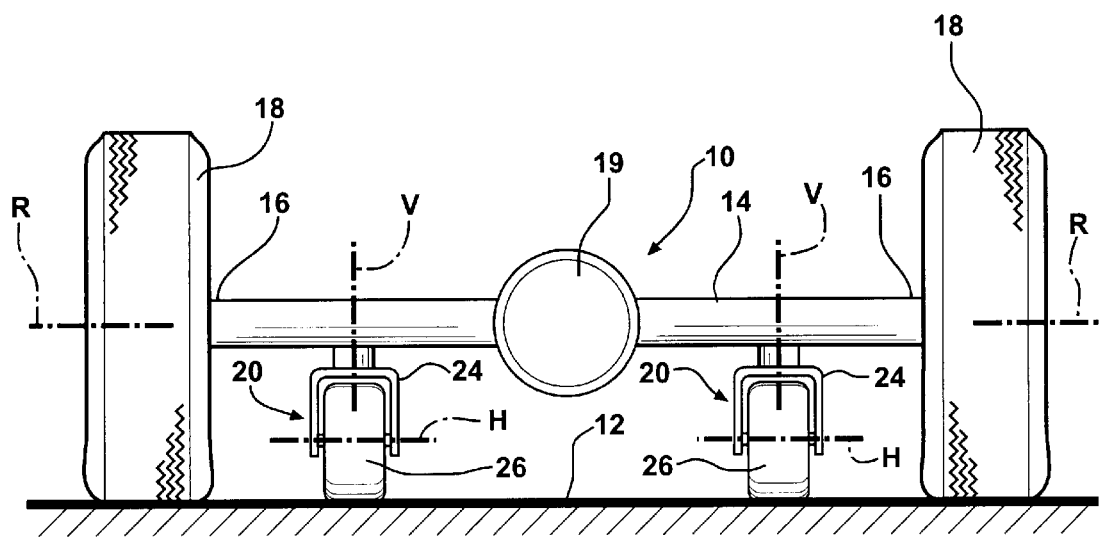
FIG. 1 is a side elevational view of the present invention axle assembly with load-bearing devices.
Figure 2:
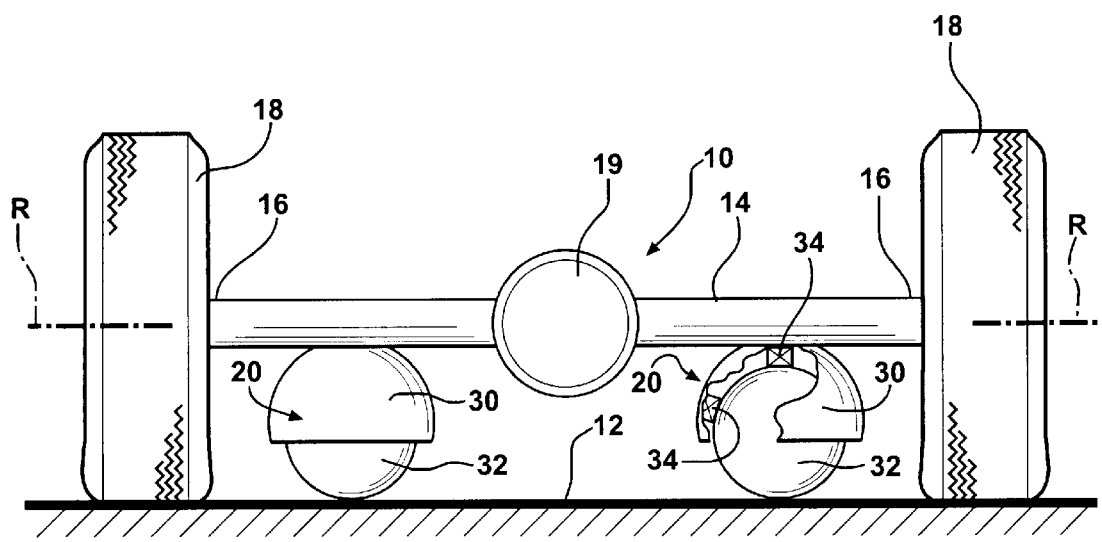
FIG. 2 is a side elevational view of an alternative embodiment of the present invention axle assembly with a partially broken view of one of the load-bearing devices.

An axle assembly 10 for supporting a heavy vehicle on a surface 12 is shown in FIGS. 1 and 2. Referring to the Figures, the axle assembly 10 has an axle housing 14 with opposing ends 16 and a wheel 18 supported on each of the opposing ends 16 for engagement with the surface 12. Each of the wheels 18 is rotatable about a rotational axis R. The axle assembly 10 may be a drive axle with the wheels 18 being driven about the rotational axes R by a drive mechanism 19, such as a differential. Further, the wheels 18 on the axle assembly 10 may be steerable.

A rotatable load-bearing device 20 is supported on the axle housing 14 for engagement with the surface 12. Preferably, there is a load-bearing device 20 is in spaced relation from each wheel 18, as shown in each of the Figures. The load-bearing device 20 is arranged between the wheels 18 and is rotatable about a plurality of pivotal axes, which is discussed in more detail below. The load-bearing devices 20 reduce scrub, and thereby wear of the load bearing component in engagement with the surface, by permitting the load bearing component to pivot about more that one axis. A worker of ordinary skill will appreciate that any number of load-bearing devices may be used.

Referring to FIG. 1, one embodiment of the present invention utilizes swivel wheels as load-bearing devices, which are permitted to move in the direction of the turn. Specifically, the load-bearing devices 20 have vertical V and horizontal H axes of rotation. The load-bearing device 20 includes a bracket 24 secured to the axle housing 14 and is pivotal about the vertical axis V. A load-bearing wheel 26 is supported on the bracket 24 and is pivotal about the horizontal axis H. As the vehicle turns, the bracket 24 and wheel 26 pivots about the vertical axis V in the direction of the turn. As a result the rotatable load-bearing devices 20 do not scrub, or drag, as would a conventional wheel.

Another embodiment of the present invention is shown in FIG. 2. The load-bearing device 20 includes a load-bearing housing 30 secured to the axle housing 14. A load-bearing ball 32 is disposed within the housing 30 and is rotatable about an infinite number of axes since the ball 32 is permitted to rotate in any direction. The load-bearing device 20 further includes a plurality of bearings 34 interposed between the load-bearing housing 30 and the load-bearing ball 32. Preferably, the load-bearing ball 32 has a spherical exterior surface 36 constructed from hardened rubber to provide increased traction between the ball 32 and the surface 12.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An axle assembly for supporting a heavy vehicle on a surface, said assembly comprising:

an axle housing having opposing ends defining a rotational axis laying in a first generally horizontal plane;

a wheel supported on each of said opposing ends for engagement with the surface, each of said wheels rotatable about said rotational axis; and a rotatable load-bearing device supported on said axle housing for engagement with the surface, said load-bearing device disposed between said wheels and rotatable about a plurality of pivotal axes wherein at least one of the pivotal axes lies in a second generally horizontal plane spaced apart from said first plane.

2. The assembly as set forth in claim 1 wherein said wheels are driven about said rotational axis by a drive mechanism.

3. The assembly as set forth in claim 1 wherein said assembly comprises two rotatable load-bearing devices.

4. The assembly as set forth in claim 1 wherein said plurality of pivotal axes comprises two axes.

5. The assembly as set forth in claim 4 wherein said two axes comprise vertical and horizontal axes of rotation.

6. The assembly as set forth in claim 5 wherein said load-bearing device includes a bracket secured to said axle housing and pivotal about said vertical axis, and a load-bearing wheel supported on said bracket and pivotal about said horizontal axis.

7. An axle assembly for supporting a heavy vehicle on a surface, said assembly comprising:

an axle housing having opposing ends;

a wheel supported on each of said opposing ends for engagement with the surface, each of said wheels rotatable about a rotational axis; and at least one rotatable load-bearing devices supported on said axle housing for engagement with the surface, said load-bearing device disposed between said wheels and rotatable about an infinite number of pivotal axes.

8. The assembly as set forth in claim 7 wherein said load-bearing device includes a load-bearing housing secured to said axle housing and a load-bearing ball disposed within said load-bearing housing and rotatable about said infinite number of axes, and wherein said load-bearing device further includes a plurality of bearings interposed between said load-bearing housing and said load-bearing ball.

9. The assembly as set forth in claim 8 wherein said load-bearing ball includes a spherical exterior surface comprising hardened rubber.

10. The assembly as set forth in claim 7 wherein said assembly comprises two rotatable load-bearing devices.

11. An axle assembly for supporting a heavy vehicle on a surface, said assembly comprising:

an axle housing having opposing ends;

a wheel supported on each of said opposing ends for engagement with the surface, each of said wheels rotatable about a rotational axis; and a rotatable load-bearing device smaller than said wheels supported on said axle housing for engagement with the surface, said load-bearing device disposed between said wheels and rotatable about a plurality of pivotal axes.

12. An axle assembly for supporting a heavy vehicle on a surface, said assembly comprising:

an axle housing having opposing ends;

a wheel supported on each of said opposing ends for engagement with the surface, each of said wheels rotatably driven about a rotational axis; and a rotatable undriven load-bearing device supported on said axle housing for engagement with the surface, said load-bearing device disposed between said wheels and rotatable about a plurality of pivotal axes.

* * * * *